(12) United States Patent
Oner (10) Patent No.: US 7,584,316 B2
(45) Date of Patent: Sep. 1, 2009

(54) PACKET MANAGER INTERRUPT MAPPER

(75) Inventor: Koray Oner, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1267 days.

(21) Appl. No.: 10/685,017

(22) Filed: Oct. 14, 2003

(65) Prior Publication Data

US 2005/0078694 A1   Apr. 14, 2005

(51) Int. Cl.
G06F 13/24   (2006.01)
(52) U.S. Cl. .................. 710/263; 710/260; 710/268
(58) Field of Classification Search .......... 710/260–269
See application file for complete search history.

(56) References Cited

U.S. PATENT DOCUMENTS

| 4,420,806 | A | * | 12/1983 | Johnson et al. ............. 710/269 |
| 4,769,768 | A | * | 9/1988 | Bomba et al. ............... 710/268 |
| 4,779,195 | A | * | 10/1988 | James .......................... 710/49 |
| 5,155,387 | A | * | 10/1992 | Fletcher et al. ............... 326/48 |
| 5,410,710 | A | * | 4/1995 | Sarangdhar et al. ......... 710/266 |
| 5,448,743 | A | * | 9/1995 | Gulick et al. .................. 710/49 |
| 5,586,046 | A | * | 12/1996 | Feldbaumer et al. .......... 716/18 |
| 5,708,816 | A | * | 1/1998 | Culbert ....................... 710/264 |
| 5,721,931 | A | * | 2/1998 | Gephardt et al. ............ 710/260 |
| 5,903,779 | A | * | 5/1999 | Park ............................. 712/300 |
| 5,905,897 | A | * | 5/1999 | Chou et al. .................. 710/260 |
| 5,918,057 | A | * | 6/1999 | Chou et al. .................. 710/260 |
| 6,055,619 | A | * | 4/2000 | North et al. .................... 712/36 |
| 6,449,675 | B1 | * | 9/2002 | Moyer et al. ................ 710/269 |
| 6,845,419 | B1 | * | 1/2005 | Moyer ......................... 710/264 |
| 6,952,749 | B2 | * | 10/2005 | Kim ............................ 710/260 |
| 7,139,857 | B2 | * | 11/2006 | Wahler ........................ 710/269 |

OTHER PUBLICATIONS

Intel Corporation. Interrupt Swizzling Solution for Intel 5000 Chipset Series Based Platforms. Application Note. Aug. 2006.*
Philips Semiconductors. Reduce CPU Overhead with Intelligence Interrupt Arbitration (I2A) Feature. Application Note. Rev. 01. Jun. 25, 2004.*
Fujitsu Microelectronics. Interrupt Usage on Flexray CC. Application Note. Version 1.0. Jan. 23, 2006.*

* cited by examiner

Primary Examiner—Mark Rinehart
Assistant Examiner—Matthew D Spittle
(74) Attorney, Agent, or Firm—Garlick Harrison & Markison (57) ABSTRACT

A multiprocessor switching device substantially implemented on a single CMOS integrated circuit is described in connection with an interrupt mapper for informing a plurality of processors about system-related functions for a plurality of channels. Using status registers containing interrupt status information for the plurality of channels, interrupt sources are specifically assigned to individual processors in the multiprocessor device so that the assigned processor can efficiently determine the source and priority of an interrupt by reading the register information.

16 Claims, 7 Drawing Sheets

PACKET MANAGER INTERRUPT MAPPER

RELATED APPLICATIONS

This application is related to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002, U.S. Provisional Patent Application Ser. No. 60/348,717, filed Jan. 14, 2002, U.S. patent application Ser. No. 10/270,016, filed Oct. 11, 2002 and U.S. patent application Ser. No. 10/269,666, filed Oct. 11, 2002, each of which is incorporated herein by reference in its entirety.

BACKGROUND OF THE INVENTION

1. Field of the Invention

The present invention is directed in general to data communications. In one aspect, the present invention relates to a method and system for monitoring interrupt status information in a multiprocessor computer device.

2. Related Art

As is known, communication technologies that link electronic devices may use multiprocessor switching devices to route and process signal information. Some communication technologies interface a one or more processor devices for processing packet-based signals in a network of computer systems. Generally, packets are used to communicate among networked computer and electronic systems. Thus, each networked system must receive and transmit packets, and must process the packets directed to that system to determine what is being transmitted to that system.

Typically, each computer system includes one or more interfaces or ports on which packets are transmitted and received. Additionally, each interface generally includes a dedicated DMA engine used to transmit received packets to memory in the system and to read packets from the memory for transmission. If a given system includes two or more packet interfaces, the system includes DMA engines for each interface. Where a computer system processes multiple packet channels using the DMA engines, the processor(s) in the system must be able to monitor the status of the DMA transfers for each channel and other system-related functions associated with the channel transfers. Conventional solutions have either used the processors to snoop the descriptors written to memory by the DMA engines, or have conveyed interrupt information on dedicated interrupt status wires to an interrupt controller circuit that maps the interrupts to the correct processor and to the correct interrupt level, resulting in a complex circuit wiring configuration that uses significant chip area to provide an interrupt mapping functionality that is often inactive. As the number of channels increases, the unwieldiness of conventional approaches also increases.

Therefore, a need exists for methods and/or apparatuses for quickly and efficiently mapping interrupts for multiple channels to multiple processors so that when a processor receives an interrupt, the processor can quickly determine from which channel the interrupt comes from and the type of the interrupt. Further limitations and disadvantages of conventional systems will become apparent to one of skill in the art after reviewing the remainder of the present application with reference to the drawings and detailed description which follow.

SUMMARY OF THE INVENTION

In accordance with the present invention, an integrated circuit system and method are provided for mapping interrupts to predetermined processors. To assist with interrupt mapping, an interrupt status register is associated with each of input and output channels serviced by the packet manager. These interrupt status registers indicate the type of interrupt being generated by the channel. Each channel has an associated mask register and multi-bit map register. The mask register selectively masks interrupt sources for the channel, while the map register specifies the particular processor that is to handle the interrupt and the priority level for the interrupt. If the interrupt source for a channel is interrupting and is not masked out, it is driven to the processor identified in its map register. In a selected embodiment, the interrupt mapper maps up to thirty-two input channels and thirty-two output channels, representing the virtual channels supported by two of the receive/transmit interface ports. More or fewer interrupt sources may be supported. As the number of interrupt sources exceeds sixty-four, additional registers will be required to handle all the sources.

In a selected embodiment, an interrupt mapper is provided in an integrated circuit multiprocessor switching device for mapping a plurality of interrupt sources from a plurality of virtual channels to a plurality of processors. Each channel has an interrupt status register for storing interrupt sources for the channel, and may also include a programmable masking register for selectively masking the interrupt sources. The sources for each channel can be merged into an interrupt indication register, such as by using OR gates. By demultiplexing each interrupt indication register under control of an interrupt mapping register that holds processor identification and priority information for each processor, the merged interrupt indication register for each channel may be coupled or mapped to a processor at a priority specified by the interrupt mapping register. The interrupt mapper may be implemented in any module of the multiprocessor switching device, including the packet manager input circuit to map input virtual channels to the processors. It may also be duplicated as part of a packet manager output circuit to map output virtual channels to the processors. When used to map both input and output channels in a packet manager circuit, the interrupt mapper of the present invention, a merged interrupt status register may contain merged interrupt values for both input and output channels. In operation, a processor receiving a mapped interrupt determines which channel generated the interrupt by running an interrupt service routine that first reads the merged interrupt status register to identify which data channel generated the interrupt and then reads the interrupt status register corresponding to the identified data channel to determine the interrupt source for the interrupting channel.

In an alternate selected embodiment, a method is provided for processing interrupts from a plurality of channels to a plurality of processors in an integrated circuit multiprocessor. When a processor receives a mapped interrupt signal, the processor reads a merged interrupt status register to identify which of the plurality of channels issued the interrupt, and then reads an interrupt source register for the identified channel to determine an interrupt source. Upon determining the channel and interrupt source, the processor processes the interrupt. In connection with the generation of the mapped interrupt signal, the interrupt sources for each channel may be programmable masked and then merged to provide an interrupt indication value for the channel. When the number of channels and associated interrupt sources exceeds a predetermined number associated with the processor data width (e.g., 64), the present invention permits the interrupt indication values for the channels to be stored in a merged interrupt status register, which may be read, in combination with the interrupt source register for the channel identified by the merged interrupt status register, by the processor to determine and process the specific cause of the interrupt. Alternatively, when the number of channels and associated interrupt sources does not exceed the predetermined number, all required interrupt source information may be stored in a single control status register. In either case, the interrupt indication values for each channel are mapped to the mapped interrupt signal under control of a processor identification value and priority value assigned to each channel.

The objects, advantages and other novel features of the present invention will be apparent from the following detailed description when read in conjunction with the appended claims and attached drawings.

DETAILED DESCRIPTION

Figure 1:
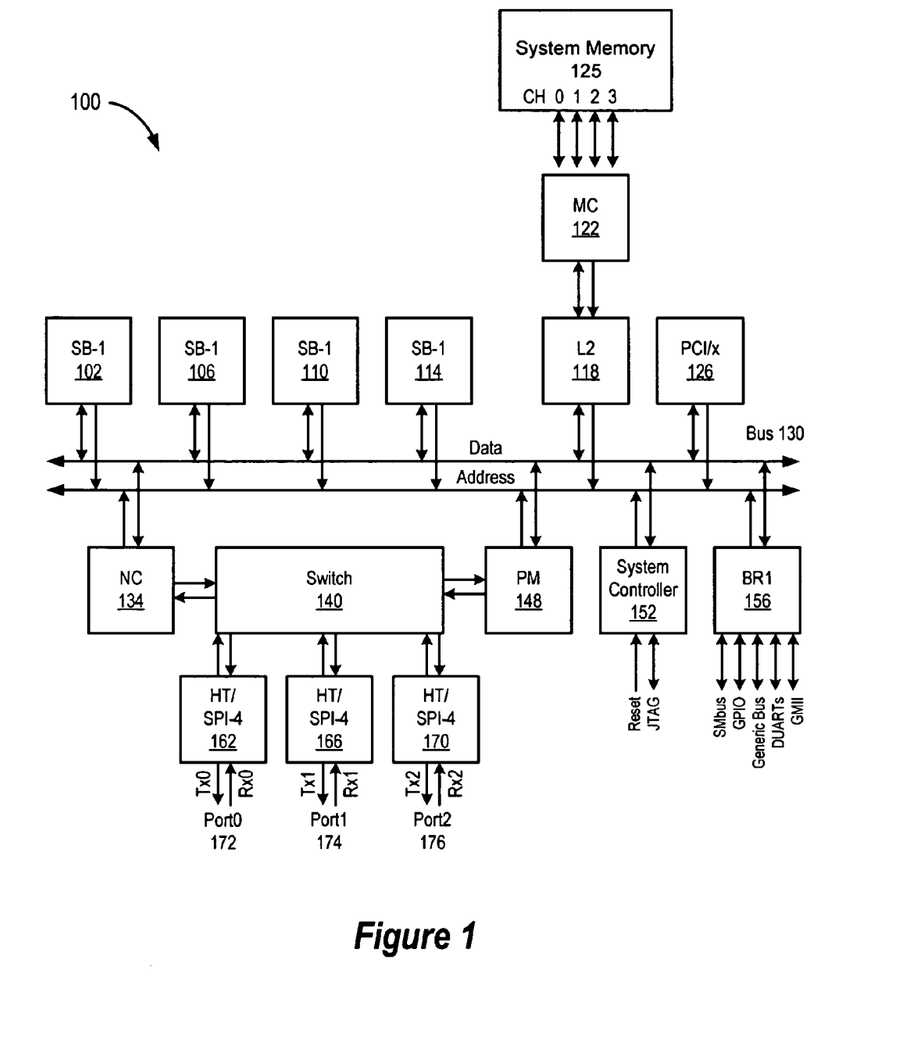
FIG. 1 shows a block diagram of a network multiprocessor switching system-on-a-chip.

An apparatus and method in accordance with the present invention provide a system for routing incoming packets through a multiprocessor switching system-on-a-chip. A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152 and a plurality of configurable packet based interfaces 162, 166, 170, such as three flexible Hyper-Transport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions. With respect to the processing system example of FIG. 2, each processing unit 102, 106, 110, 114 may be a destination within multiprocessor device 100 and/or each processing function executed by the processing modules 102, 106, 110, 114 may be a source within the processor device 100.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including a PCI/PCI-X interface 126 and the input/output bridge interface 156 for the generic bus, SMbus, UARTs, GOIP and Ethernet MAC.

The cache memory 118 may function as an L2 cache for the processing units 102, 106, 110, 114, node controller 134 and/or packet manager 148. With respect to the processing system example of FIG. 2, the cache memory 118 may be a destination within multiprocessor device 100.

The memory controller 122 provides an interface to system memory, which, when the multiprocessor device 100 is an integrated circuit, may be off-chip and/or on-chip. With respect to the processing system example of FIG. 2, the system memory may be a destination within the multiprocessor device 100 and/or memory locations within the system memory may be individual destinations within the device 100 (as illustrated with channels 0-3). Accordingly, the system memory may include one or more destinations for the multi-node processing systems. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output each having its own DMA engine and associated cache memory. The cache memory may be arranged as first in first out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three Hyper-Transport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HT mode, in which case, it uses a special extension called Packet-over-HT (POHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

In a selected embodiment, the system controller 152 is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapper can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independent of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, and the packet interface circuits 162, 166, 170 may be tightly coupled to receive packets, process them, and forward the packets on (if necessary).

The tight coupling may be manifest in several fashions. For example, the interrupts may be tightly coupled. An I/O device (e.g., the packet interface circuits 162, 166, 170) may request an interrupt which is mapped (via an interrupt map in the packet manager or system controller) to one of the processors 102, 106, 110, 114. The transmission of the interrupt to the processor may be rapid since the signals may be transmitted at the clock frequency of the integrated circuit comprising the system 100 (as opposed to interconnecting separate integrated circuits). When the processor (e.g., 102) executes the interrupt service routine, typically one or more status registers in the system controller 152 and/or the interrupting device are read. These status register reads may occur with relatively low latency across the bus 130 (as opposed to, for example, a high latency peripheral bus such as PCI). The latency of the status register reads may, in some embodiments, be one or more orders of magnitude less than that of a peripheral bus such as PCI.

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three $8/16$-bit receive/transmit ports 162, 166, 170 are also provided that are configurable as either HyperTransport or SPI-4 links. Additional peripheral features include a 32-bit $33/66$-MHz PCI interface or 64-bit 133 MHz PCI/x interface 126; an input/output bridge 156 that includes a 10/100/1000 Ethernet MAC interface, general-purpose I/O ports, SMBus serial interfaces and four DUARTs.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs), and may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
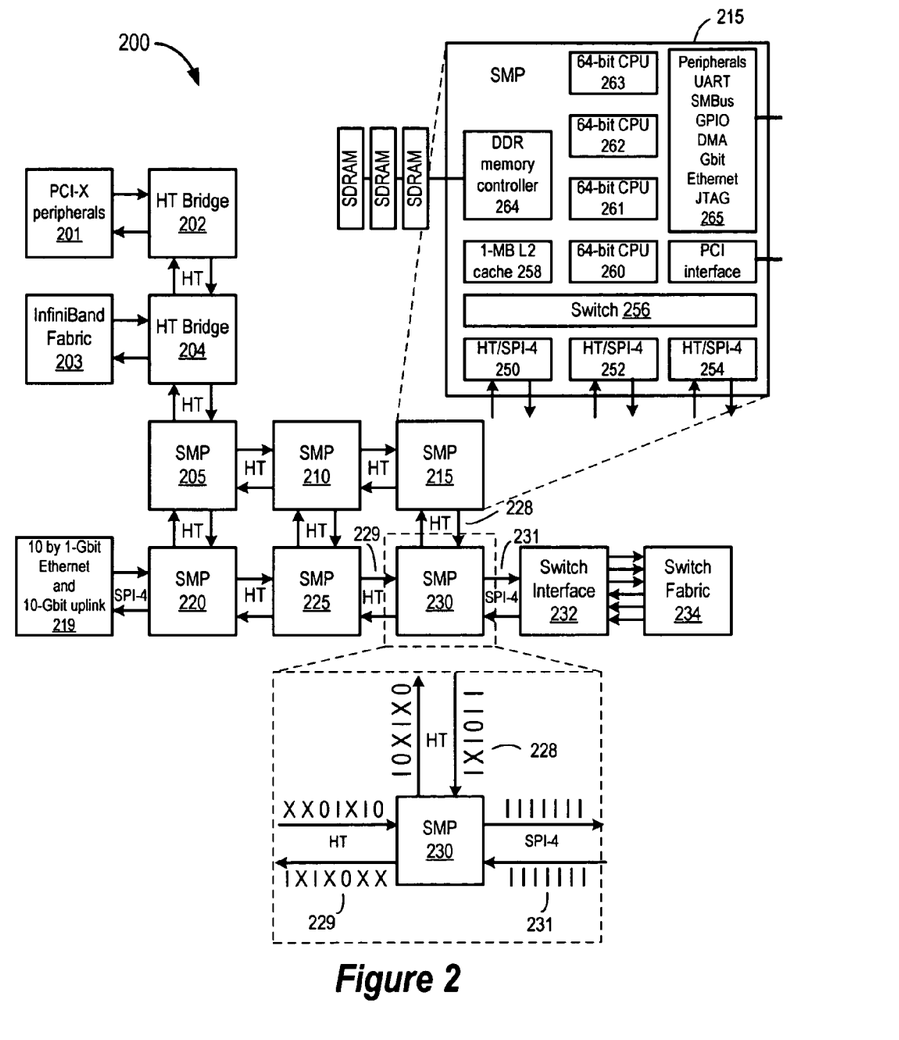
FIG. 2 depicts an example multiprocessor switch application of the present invention.

FIG. 2 depicts an example multiprocessor switch application of the present invention showing how the HyperTransport/SPI-4 link architecture can be used in communication and multichip multiprocessing support. As illustrated, each link (e.g., 250, 252, 254) can be configured as an 8- or 16-bit HyperTransport connection, or as a streaming SPI-4 interface. In addition, each link includes hardware hash and route acceleration functions, whereby routing information for an incoming packet are calculated. The routing information determines how a packet will steer through the internal switch (e.g., 256) of a multiprocessor device (e.g., 215). The destination through the switch can be either an output port or the packet manager input. Generally speaking, the steering is accomplished by translating header information from a packet (along with other input data) to an output virtual channel (OVC). In addition, the HyperTransport links (e.g., 250, 252, 254) work with a mix of HyperTransport transactions, including encapsulated SPI-4 packets and nonlocal NUMA memory access.

Large amounts of streaming data can also be handled when a port (e.g., 231) is set up as an SPI-4 link. This is ideal for high-speed communication environments. It can supply a link to external communication connections that have a native SPI-4 interface like Ethernet MACs 219 or to switch-fabric interface chips 232, 234.

As illustrated in FIG. 2, three HyperTransport links (e.g., 228, 229, 231) enable an expandable system. Two links (e.g., 228, 229) are needed for a pass-through architecture where multiple units (225, 230, 215) are daisy-chained together. In this configuration, the links 228, 229 between multiprocessor units carry HT I/O packets (indicated as "X" data in FIG. 2), ccNUMA packets (indicated as "0" data in FIG. 2) and/or SPI-4 packets (indicated as "|" data in FIG. 2). The pass-through architecture is ideal for processing as data moves along the chain. Unfortunately, implementing the same links for NUMA transfers will reduce the bandwidth available for other traffic. It is possible to link a pair of chips using the third link for NUMA transfers if the daisy-chained link bandwidth is needed for I/O or network packets. A third link allows the nodes in the array to extend in another direction. This can work in two ways. It can supply another path for a daisy-chain architecture. It can also provide additional processors to work on data forwarded from the daisy-chain data stream. This is great for such applications as the VPN processing that is handed off to additional processing nodes. Alternatively, when the third link (e.g., 231) is used to connect the multiprocessor unit 230 to an external switch interface 232, the third link carries SPI-4 packets (indicated as "|" data in FIG. 2).

Figure 3:
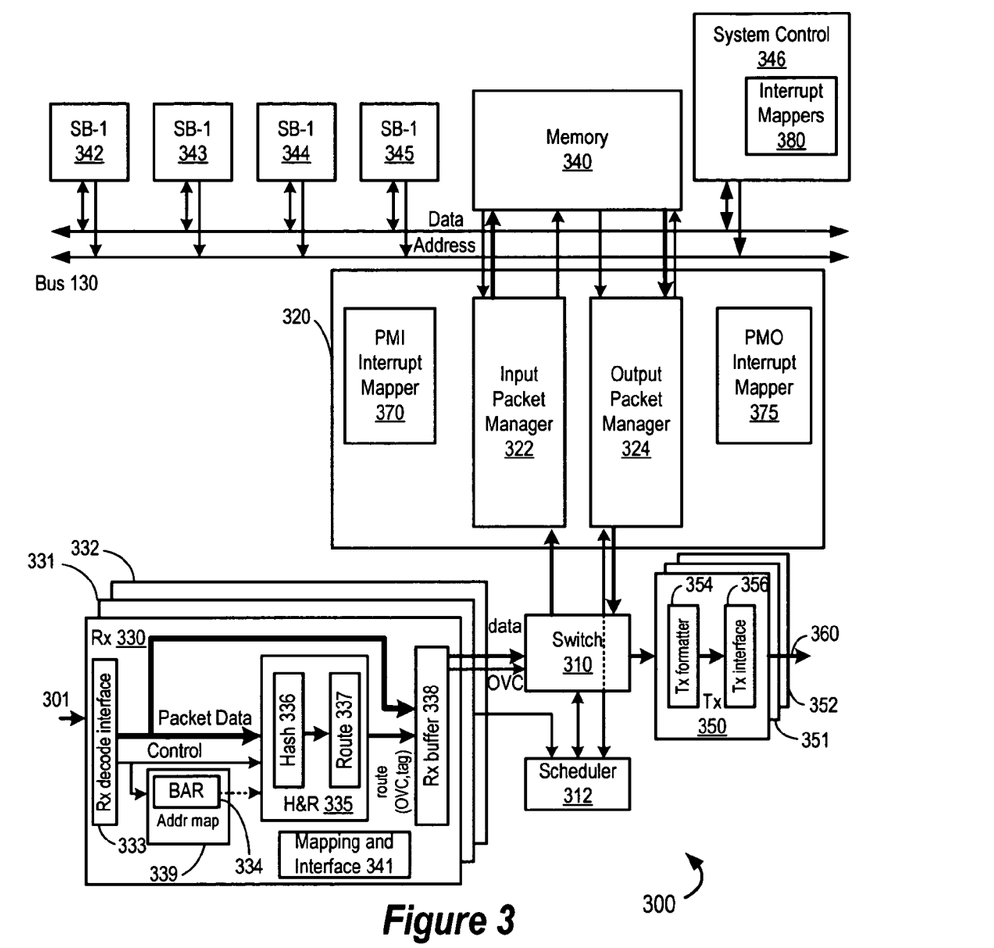
FIG. 3 depicts various implementations of the interrupt mapper for mapping interrupts to individual processors in accordance with the present invention.

FIG. 3 depicts additional selected details concerning the receiver port, packet manager and system controller of the multiprocessor device of the present invention which includes interrupt mapper(s) for mapping interrupts to individual processors. In particular, each receiver circuit 330-332 includes a hash and route (H&R) circuit 335 in the illustrated embodiment, which maps packets from the IVCs to an output virtual channel (OVC). The OVC is used as the internal virtual channel for the system 300, and in particular is used to transmit packets through the switch 310 to the packet manager circuit 320 or to the transmitter circuits 350-352. Viewed in another way, requests to transmit packet data through the switch 310 are made based on the OVC of the packet, which identifies both the destination of the packet and the virtual channel at the destination. The OVC may also be referred to herein as a destination and the virtual channel at the destination. An example of how input virtual channels are routed by the H&R circuit via OVCs to various virtual channels for input queue and transmitter destinations is depicted in U.S. patent application Publication No. US 2003/0095559 A1, FIGS. 2-4 and the associated description of which was filed on Oct. 11, 2002, and is incorporated herein by reference in its entirety.

As depicted, the network and system chip 300 includes an on-chip five-port switch 310 that connects a node controller (shown in FIG. 1 as node controller 134) and packet manager 320 to three high-speed transmit/receiver circuits 330-332, 350-352. Software resident in the memory 340 and processors 342, 344 may process and modify incoming packets, may require direct storage in memory 340 without modification, and may generate packets for transmission via transmitter circuits 350-352. The node controller manages HyperTransport (HT) transactions and remote memory accesses for the cache coherent, distributed-shared-memory model of the system. The packet manager 320 provides hardware-assisted packet processing capabilities, such as DMA engines, channel support, multiple input/output queues, TCP/IP checksum functions, and output scheduling. The high-speed receiver and transmitter circuits can operate in one of two modes; HT or SPI-4 Phase 2. The 16-bit HT mode allows connection to companion multiprocessor devices in a daisy-chain configuration, to HyperTransport bridge chips for additional I/O devices, or to an external switch for scalable bandwidth applications. The SPI-4 mode is intended for direct connection to physical layer network devices—e.g., 10 GE MAC, OC-192 SONET framer, or to an application specific (ASIC) chip that provides customer enabled network functions.

In the embodiment of FIG. 3, the receiver circuit 330 includes a decoder interface 333 (which includes an SPI decoder and an HT decoder including a PoHT BAR register 334), a hash and route (H&R) circuit 335, a receiver buffer 338 and additional interface and mapping circuitry 341 for interfacing with the switch 310 and scheduler 312. Other receiver circuits 331, 332 may be similar. The decoder 333 is coupled to receive input data on the port 301, and is coupled to provide an input virtual channel (IVC) and the packet data to the H&R circuit 335. The decoder 333 is also coupled to provide the packet data to the receiver buffer 338 for storage. The H&R circuit 335 is configured to generate an OVC and optionally a next destination (next_dest) value, which are received by the receiver buffer 338. The receiver buffer 338 is coupled to the switch 310 and scheduler 312. The H&R circuit 335 may also be coupled to a packet manager input map register 341.

The decoder 333 receives the input data from the port 301 and decodes the data according to the SPI specification (in the SPI decoder mode) or the HT specification (in the HT decoder mode). The decoding mode depends on which port 172, 174, 176 the receiver circuit 330 is coupled to, and may be selected in any desired fashion. The PoHT extension to the HT interface defines an address range (stored in the PoHT BAR register 334) to which HT sized-write commands may be directed in order to transmit packet data. The IVC may be carried in the sequence ID field of the HT packet, and selected bits of the address may indicate whether the data is the start of packet, middle of packet, or end of packet, the number of valid bytes in the last doubleword of the HT packet, and an error status. If an HT sized-write is decoded, and the address is in the address range indicated by the PoHT BAR register 334, the HT packet is a PoHT packet and the data transmitted with the sized write is packet data.

The decoder 333 provides the IVC of the packet and the received packet data to the H&R circuit 335. The H&R circuit 335 may select bytes of the packet data and/or the IVC and generate a corresponding OVC for use by the switch 310 in routing data on the chip 300. While the H&R circuit may implement any hashing and mapping function, in one embodiment the H&R circuit may support a number of programmable rules. Each rule selects bytes from the data (or the IVC) as the packet goes by and compares the selected data to an operand of the rule. Each rule may be evaluated on packet data and the true/false results of each comparison may be input to a path table. The path table includes entries which search for selected true or false results from the rules, and outputs path data from a matching entry. The path data may be an OVC, may be an index to a route table which outputs an OVC, or may select the output of a hash function or an extract function as the index to the route table (which may optionally be added to a base address which is also part of the path data). Additionally, for HT interfaces (such as an HT switch), a next_dest value may be output which is used to indicate to a transmitter circuit 350-352 on an HT interface, which base address to select from a table of base addresses for the write command comprising the PoHT packet. If the OVC indicates a virtual channel for the packet manager input 322, the H&R circuit 335 may use a packet manager input (PMI) map register 341 to map the virtual channel to an input queue of the packet manager input 322.

The path of a packet through the multiprocessor device 300 will now be described with reference to the network and system chip 300 depicted in FIG. 3. In this example, a packet comes into the chip through one of the receiver ports (e.g., 301), reaches software, is potentially modified, then sent to another chip through a transmit port 360.

Packet Reception

1. The packet 301 arrives through one of the three receiver interfaces 330-332 of the chip. The receiver interface (e.g., 330) can run in either SPI-4.P2 mode (native packet mode) or in HyperTransport (HT) mode, in which case, it uses a special extension called Packet-over-HyperTransport (PoHT) to transfer the packets. From a logical perspective, both modes provide almost identical services. The receiver interface 330 deals with the specifics of the protocol and converts the control and data streams 301 into an internal packet format for the chip.

2. The packet control and data streams are sent to the hash and route (H&R) block 335, which includes a hash 336 and route 337 functionality. The purpose of the hash block 336 is to extract fields from the packet (specific parts of the headers usually) and hash them if necessary. The hash block 336 provides a small signature of the packet to a route table 337. Hashing is completely optional, can consist of the simple extraction of a byte from the packet, or can be any technique or algorithm that turns a variable-sized amount of text into a fixed-sized output (hash value).

3. The route block 337 takes parameters from the packet (such as the result of the hash and the input virtual channel the packet came in on) and looks up in a table to figure out where exactly the packet will go. Not only is the destination block determined (transmitters 350-352 or packet manager input (PMI) 322), but block-specific values like the virtual channel (for a transmitter) or the input queue (for the PMI) are also output from the route block 337.

4. While the packet is hashed and routed, it is also stored in the receiver buffer 338, which may be a large (e.g., 16 KB) buffer. The stored packet data will stay there until a routing decision has been made and it is scheduled to its destination block. The packet does not need to be entirely stored in the buffer 338 before being sent to its destination. For example, if the routing has been determined early, the first (e.g., 16 byte) chunk of data can be sent as soon as a threshold amount of bytes of the packet has been gathered.

5. As soon as a chunk of data from the packet is ready to go, the receiver interface (e.g., 330) sends a request to the switch scheduler 312. When the chunk can be scheduled, the scheduler 312 applies the required changes to the switch 310 and informs the receiver buffer 338 that it can start transmitting.

6. The receiver buffer 338 sends the chunk of data to the switch 310 and frees up the buffer space for more incoming packet data.

7. In this example, the routing table 337 has determined that the packet should be sent to the packet manager 320 to be processed by software. The input packet manager (PMI) portion 322 receives the packet data from the switch 310. A specific input queue (IQ) of the PMI 322 is chosen for the packet by the H&R module 335.

8. To know where to put the packet data, the PMI 322 reads one or more descriptors from main memory 340 (or from L1 or L2 caches or from a remote note). The descriptors contain the address and sizes of data buffers set aside by software to be used for incoming packets. They are also used as a synchronization mechanism between hardware and software.

9. As soon as the PMI 322 has a buffer to put the packet data into, it starts streaming the data to the memory 340 through the system bus. Once again, the final storage might be in a cache or in main memory.

10. When the PMI 322 is done with the packet, it writes back information about the packet in the descriptor(s) to tell the software that it is done with the packet and communicate some information about the packet (like its size).

11. The software typically waits (e.g., spins) on the descriptors in the various queues and as soon as one is marked ready by the PMI 322, it reads it. It can also be interrupted by the PMI 322 when a new packet arrives. It can also read the current pointer of the PMI 322 for a particular IQ.

12. The packet data is typically read, at least in part, by the software to figure out what to do with it. There is no particular constraint on which CPU 342, 344 deals with which IQ. There must just be some synchronization between the CPUs if IQs are shared.

Software Background Tasks

13. In the background, software finds free data buffers (typically recycled from packets just transmitted from an output queue (OQ)) and updates the descriptors in the IQs to provide the PMI 322 with storage for future packets. The software also updates a count field in the PMI 322 to tell it the number of new descriptors added.

14. As in the previous step, the software needs to reclaim output queue (OQ) descriptors that have been processed by the output packet manager (PMO) in order to free the data buffers and potentially use them for IQ descriptors.

Packet Transmit

15. When the software wants to send or forward a packet (e.g., from CPU 344), it needs to write it into a buffer in memory 340. Depending on the source of the packet data (higher-level software, fragments of input packets . . . ), the software might need to fully copy or create the packet data, modify it or leave it as is.

16. When the packet data is ready, the software will write one or more descriptors in the output queue (OQ) of the PMO 324 that has been chosen for the packet. The descriptor(s) contain essentially the address of the buffer where the packet fragments can be found and their size.

17. The PMO 324 waits for descriptors to be ready for transfer in the OQs. The software writes to a special register in the PMO 324 every time it adds new descriptors to be transmitted. Descriptors are read by the PMO 324 to extract the relevant information.

18. When the address where the packet resides at in memory 340 is known to the PMO 324, through the descriptor(s), the PMO 324 starts reading the address. The PMO 324 has a large output buffer equivalent to the receiver buffer 338, which is used to prefetch outstanding packet chunks, waiting for them to be scheduled for transmission.

19. PMO 324 writes the descriptor(s) back to memory 340 when the data associated with each descriptor is completely placed in the output buffer.

20. Each OQ in the PMO 324 sends all of its packets to the same internal destination (block, virtual channel). However, different OQ's can have different destinations. Accordingly, as soon as the PMO 324 has a full chunk of data available, it sends a request to the scheduler 312, much like the receiver interface does in step 5, to get the chunk scheduled to its destination. The scheduler 312 arbitrates between the many requests and when a chunk is scheduled, it changes the connections in the switch 310 and informs the source (the PMO 324 in this case) that it can transmit the chunk.

21. As soon as the PMO 324 gets a grant from the scheduler 312, the PMO 324 transmits the corresponding chunk of data to the switch 310. The PMO 324 can then free and reuse the allocated storage in the PMO buffer.

22. The switch 310 forwards the chunk of data to the final destination, such as a transmitter 350 in this example, as indicated by the scheduler 312.

23. Just like the receiver interfaces, the transmitters 350-352 can run in SPI-4 or HT mode. The transmitter formatter 354 will take the incoming packet data chunks from the switch and will format them according to the mode it is configured in. While the PMO 324 has enough storage to cover the round-trip latency to main memory, the transmitters 350-352 provide minimal buffering (4 KB) required to assemble outbound bursts of data on the high-speed links. In a selected embodiment, all data transmits through a 4 KB transmit buffer.

As will be appreciated, packets can go through the switch 310 without touching memory 340 and CPUs 342, 344 (skipping steps 7 to 21). Packets can also be sinked by software and not be forwarded (skipping steps 14 to 23) or sourced by software directly (skipping steps 1 to 13).

In a selected embodiment, each VC is independently flow-controlled so that if one VC is blocked, the other ones can still flow through. This way, there is no head-of-line (HOL) blocking due to the congestion of a flow. In addition, the flow of packets is controlled so that packets on the same VC travel one after the other, and fragments of different packets cannot be interleaved within the chip 300. By including start of packet (SOP) and end of packet (EOP) signaling in the control signal, the receivers can differentiate between the packets, even when packets of different VCs are interleaved on the input and output ports, depending on the unit of transfer on the underlying physical channel. In SPI-4 mode, each high-speed receive/transmit port (e.g., 162 in FIG. 2) supports multiple (e.g., 16) VCs with independent, calendar-based flow control. In HT mode, each high-speed receive/transmit port uses a special extension to the regular HT protocol called Packet-over-HyperTransport (PoHT) which emulates the functionality of the SPI-4 interface, providing multiple (e.g., 16) independent channels per port (in addition to the regular, non-packet HT and HTcc VCs).

The hash and route (H&R) block 335 makes all of the routing decisions for ingress packets from the high-speed receiver ports 330-332 by calculating, for each packet, an output virtual channel (OVC) which is used for internal switching on the multiprocessor device 300. The packets are then sent to either the packet manager input (PMI) 322 or to one of the transmit ports 350-352. The H&R module 335 is located in each of the three high-speed receiver ports 330-332. As a packet 301 enters the receiver port (e.g., 330), it is decoded and control information is extracted by the receiver interface or decoder 333. The H&R module 335 calculates the routing result by using this control information along with the packet data and several programmable tables in the H&R module 335. Routing information is encoded in the form of a switch or output virtual channel (OVC) which is used by the on-chip switch 310 to route packets. The OVC describes the destination module, such as the PMI 322 or transmitter ports 350-352, and either the input queue number (IQ) in the case of the PMI or the output channel in the case of the transmitter ports. When targeting the packet manager 320, the output virtual channel corresponds directly to IQs. On the output side, the packet manager 320 maps an OQ into one OVC which always corresponds to a transmitter port. In addition, multiple sources can send packets to a single destination through the switch. If packets from different sources (receivers 330, 331, 332 or PMO 324) are targeted at the same output VC of a transmitter port or the IQ of the PMI 322, the switch 310 will not interleave chunks of packets of different sources in the same VC. Both the packet data and its associated route result are stored in the receiver buffer 338 before the packet is switched to its destination. The H&R module 335 can be implemented by the structures disclosed in copending U.S. patent application entitled "Hash and Route Hardware With Parallel Routing Scheme" by L. Moll, having a patent application Ser. No. 10/684,871 and a filing date of Oct. 14, 2003, now U.S. Pat. No. 7,366,092, and assigned to Broadcom Corporation, which is also the assignee of the present application, and is hereby incorporated by reference in its entirety.

Figure 4:
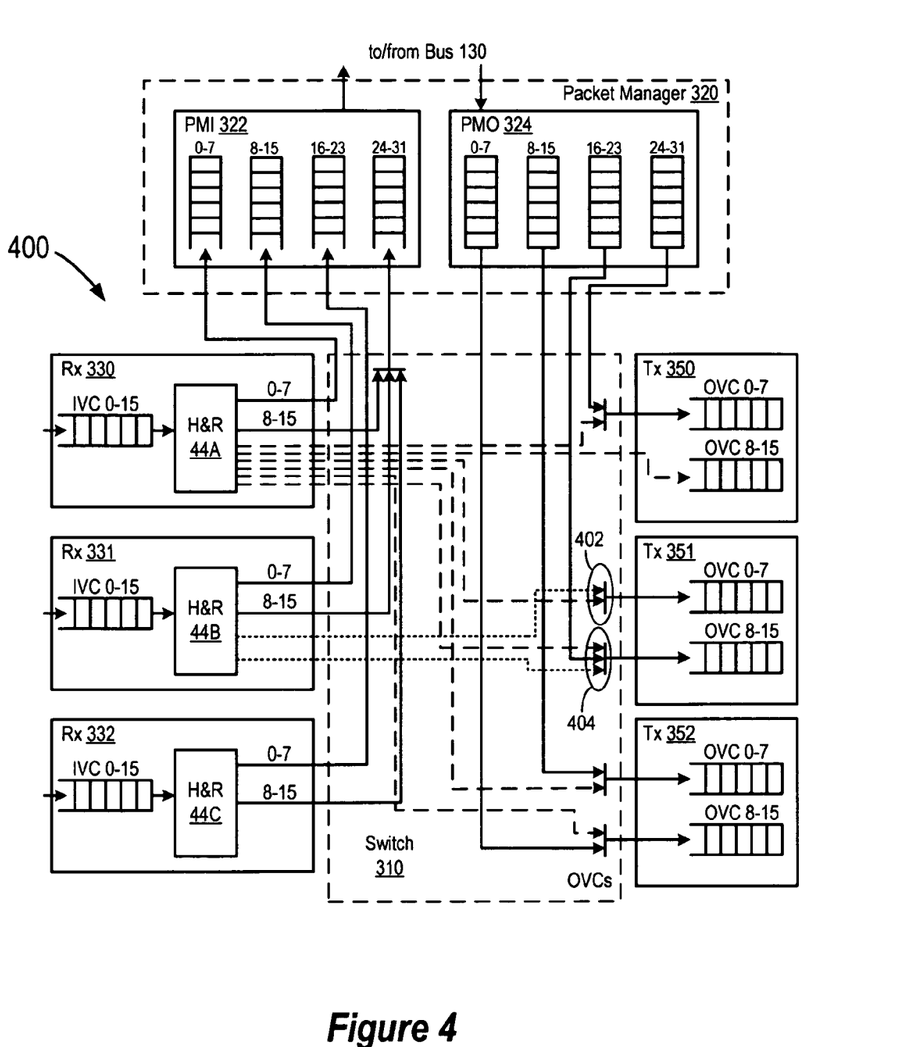
FIG. 4 is a block diagram illustrating one embodiment of virtual channels in the system of FIG. 1.

Turning now to FIG. 4, a block diagram illustrating one embodiment of virtual channels in the system 300 is shown, as well as examples of splitting and merging packet traffic. In the illustrated embodiment, the receive interface circuits 330-332 and the transmit circuits 350-352 are shown. Additionally, the packet manager circuit 320 is shown as including an input packet manager circuit (PMI) 322 and an output packet manager circuit (PMO) 324. The PMI 322 is coupled to transmit write commands on the bus 130 to write received packets to memory. The PMO 324 is coupled to transmit read commands on the bus 130 and to receive the read data comprising packets to be transmitted from the system 300. Additionally, as mentioned above, each of the PMI 322 and the PMO 324 may be configured to read and write descriptors defining the locations in memory to which the packets are to be read and written. Each of these events and others may cause interrupts to be issued by the packet manager 320 which, in accordance with the present invention, are mapped to a predetermined or dedicated processor for handling.

Each receive circuit 330-332 supports a set of input virtual channels (IVCs) defined by the interface from which the receive circuit receives packet data. For example, the SPI-4 interface and the HT interface may both support 16 virtual channels in hardware (although more may be used by software in the SPI-4 interface, since an 8-bit virtual channel value is supported). Thus, each receive circuit 330-332 supports 16 IVCs (numbered 0-15 in FIG. 4). Similarly, each transmit circuit 350-352 supports 16 output virtual channels (OVCs), numbered 0-15 in FIG. 4. Other embodiments may employ more or fewer IVCs and OVCs according to the interfaces supported by those embodiments.

The PMI 322 includes a logical set of input queues (e.g. 32 in the illustrated embodiment, numbered 0-31, although more or fewer input queues may be included in other embodiments). The PMO 324 includes a logical set of output queues (e.g. 32 in the illustrated embodiment, numbered 0-31, although more or fewer output queues may be included in other embodiments). In the packet manager, each queue has its own interrupts that require mapping to a specified processor.

Each receive circuit 330-332 includes a hash and route (H&R) circuit 44A-44C in the illustrated embodiment, which maps packets from the IVCs to an output virtual channel (OVC). The OVC is used as the internal virtual channel for the system 400, and in particular is used to transmit packets through the switch 310 to the packet manager circuit 320 or to the transmit circuits 350-352.

In the illustrated embodiment, the H&R circuits 44A-44C may map the IVCs to one of 16 PMI VCs (numbered 0-15 in FIG. 4, using solid lines from the H&R circuits 44A-44C). These PMI VCs may be further mapped to input queues in the PMI 322, e.g., using a register to which the H&R circuit 44A is coupled. That is, VCs at the PMI 322 may correspond directly to input queues. In the illustrated embodiment, PMI VCs are mapped to input queues in blocks of eight (e.g., PMI VC 0-7 is mapped to input queue 0-7, or input queue 8-15, or input queue 16-23, or input queue 24-31 in a one-to-one fashion). In other embodiments, each PMI VC may be individually mappable to an input queue, or other sized blocks of input queues may be mappable to PMI VCs. In yet another embodiment, the H&R circuits 44A-44C may directly map IVCs to PMI input queues (e.g., without the intermediate step of PMI VCs). Additionally, the H&R circuits 44A-44C may map packets from an IVC to an OVC in one of the transmit circuits 350-352, illustrated for H&R circuit 44A with dashed lines through the OVCs block to the transmit circuits 350-352.

The H&R circuits 44A-44C may be used to split packets from the same IVC to different OVCs (e.g., different input queues in the PMI and/or OVCs in the transmit circuits 350-352). Thus, the H&R circuits 44A-44C may provide software flexibility to separate packets for processing versus packets to be passed through the transmit circuits 350-352 based on various packet attributes (such as header values), or may provide for separating packets into different input queues in the PMI 322 (e.g., for different types of processing) based on various packet attributes. The H&R circuits 44A-44C may also be programmed to map IVCs to OVCs without using any additional packet attributes, or a combination of such mappings and other mappings using additional packet attributes, as desired. In other embodiments, the receive circuits 330-332 may not include H&R circuits and may instead use a programmable or fixed mapping of each IVC to a specified OVC (transmit circuit 350-352 and OVC in that circuit or PMI 322 and an input queue in the PMI 322). It is noted that packets which are routed from a receive circuit 330-332 directly to a transmit circuit 350-352 bypass the packet manager circuit 320, the system memory, and processing by the processors.

The PMO 324 output queues are also mapped to various transmit circuits 350-352 and to OVCs in those transmit circuits 350-352. In the illustrated embodiment, output queues are mapped to transmit circuits and OVCs in blocks of 8, similar to the mapping of IVCs to input queues. Other embodiments may map output queues individually, or in other-sized blocks, as desired. In one embodiment, the PMO 324 includes a configuration register or registers programmed with the mapping of each block of 8 output queues to a corresponding group of OVCs (which identify the transmit circuit 350-352 and the OVC within that transmit circuit). Other embodiments may use more elaborate mapping mechanisms similar to H&R circuits, to map packets based on packet attributes in addition to output queues, if desired.

FIG. 4 illustrates, via the solid arrows between the H&R circuits 44A-44C and the PMI 322, an exemplary mapping from the PMI VCs of the H&R circuits 44A-44C to the input queues of the PMI 322. The exemplary mapping is but one example of the mappings that may be used, as programmed into the receive circuits 330-332 by software. In the example, PMI VCs 0-7 from the H&R circuit 44A are mapped to input queues 0-7; PMI VCs 0-7 from the H&R circuit 44B are mapped to input queues 8-15; PMI VCs 0-7 from the H&R circuit 44C are mapped to input queues 16-23; and PMI VCs 8-15 from each of the H&R circuits 44A-44C are merged to input queues 24-31. When mappings merge the PMI VCs from different H&R circuits 44A-44C, the switch 310 may perform the merging on packet boundaries. That is, when a given receive circuit 330-332 has been granted permission to transfer a packet to an input queue that is merged among the receive circuits 330-332, the switch inhibits granting any other receive circuit 330-332 on that input queue until the granted receive circuit 330-332 reaches a packet boundary. Any combination of PMI VCs from different receive circuits 330-332 may be merged into input queues, as desired in various mappings.

FIG. 4 also illustrates, via the solid arrows between the PMO 324 and the transmit circuits 350-352, an exemplary mapping of output queues to transmit circuits and OVCs. The exemplary mapping is but one example of mappings that may be used, as programmed by software. In the illustrated mapping, output queues 0-7 are mapped to OVCs 8-15 in the transmit circuit 352; output queues 8-15 are mapped to OVCs 0-7 in the transmit circuit 352; output queues 16-23 are mapped to OVCs 8-15 in the transmit circuit 351; and output queues 24-31 are mapped to OVCs 0-7 in the transmit circuit 350. Additionally, receive circuits 330-332 may map IVCs to OVCs, and thus there may be merging of packets from receive circuits 330-332 and output queues to an OVC. Again, the switch 310 may handle this merging on packet boundaries.

As mentioned above, there may be mappings of IVCs in receive circuits 330-332 to OVCs in the transmit circuits 350-352. In FIG. 4, for example, dashed lines illustrate possible mappings from the receive circuit 330 IVCs (via the H&R circuit 44A) to the OVCs of the transmit circuits 350-352. Additionally, dotted lines from the receive circuit 331 (the H&R circuit 44B) to the transmit circuit 351 OVCs illustrate two possible mergings of packet streams, one indicated at 402 where the packet stream from receiver 331 merges with a packet stream from receiver 330 into OVC 0-7 in transmitter circuit 351, and the other indicated at 404 where the packet stream from receiver 331 merges with a packet stream from receiver 330 and a packet from PMO channels 16-23 into OVC 8-15 in transmitter circuit 351. Again, the switch 518 may merge packets from different receive circuits 330-332 to a given OVC on a packet boundary basis. Merging may occur between any combination of receive circuits 330-332 and the PMO 324.

The input queues of the PMI 322 and the output queues of the PMO 324 may be logical queues. That is, the queues may actually be implemented in system memory. The PMI 322 and the PMO 324 may include buffers to buffer the packet data being transmitted to and from the system memory. The queues may be implemented in any fashion. In one particular embodiment, each queue is implemented as a descriptor ring (or chain) which identifies memory buffers to store packet data corresponding to a given input queue. In other embodiments, the queues may be implemented in any desired fashion (e.g., linked lists, contiguous memory locations for the packet memory buffers, etc.). The PMI 322 and the PMO 324 may generate read and write commands to fetch and update descriptors.

It is noted that, while the receive circuits 330-332 and the transmit circuits 350-352 are described as supporting various virtual channels for packets, in some embodiments these circuits may support additional virtual channels for other types of traffic. For example, the HT interface is capable of carrying non-packet traffic (e.g., I/O traffic) in additional virtual channels. Additionally, in one embodiment, the HT interface may support coherent virtual channels (that is, virtual channels that carry coherent traffic) for transactions used to maintain coherency among devices on the HT interface. The receive circuits 330-332 and the transmit circuits 350-352 may be designed to additionally route data received on these VCs according to the HT definition and/or coherency requirements.

Figure 5:
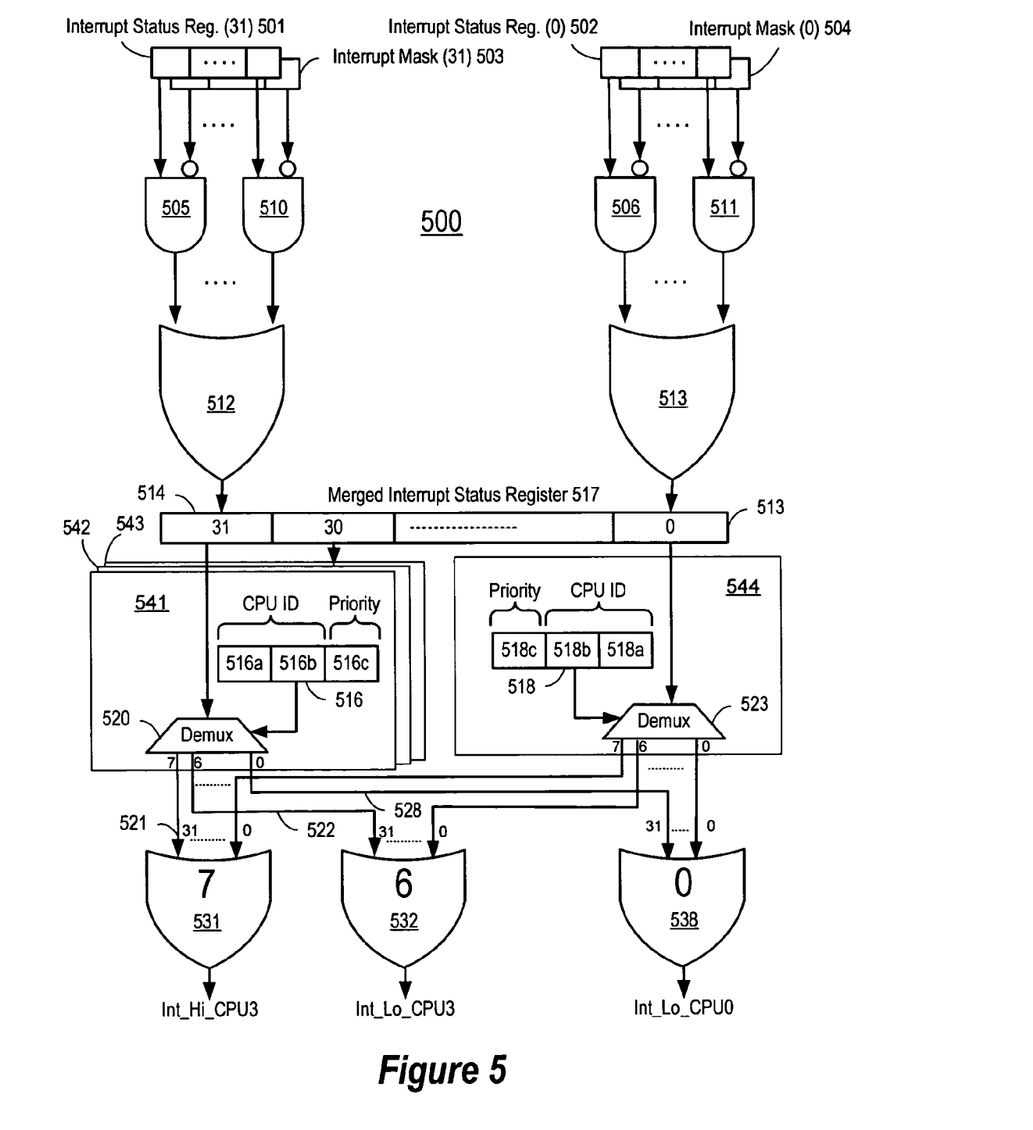
FIG. 5 is a block diagram of one embodiment of a packet manager interrupt mapper for thirty-two input channels implemented in a packet manager input circuit in accordance with the present invention.

Turning now to FIG. 5, a block diagram of one embodiment of a packet manager interrupt mapper for thirty-two input channels implemented in a packet manager input circuit is depicted in accordance with the present invention. As depicted in FIG. 5, the interrupt sources from the packet manager input are masked, merged and combined into a merge interrupt status register 517. Mapping circuitry (e.g., 541) for each channel then demultiplexes each merged status bit (e.g., bit 514 for channel 31 in the merged interrupt status register 517) into the mapped interrupted signals using the map register 516 as a demultiplex control, where the map register specifies the processor identification and priority for each channel interrupt. Other input channels (channels 0-30) may likewise use mapping circuitry (e.g., 542, 543, 544, etc.) to generate mapped interrupt signals for the processors or CPUs. In the packet manager output, another interrupt mapper is replicated to generate mapped interrupt signals for the output channel. As a result, when the processors or CPUs (343-345) execute the interrupt service routine, one or more status registers in the system controller 346 and/or the interrupting device (e.g., packet manager 320) are read. These status registers are used to map interrupts to predetermined CPUs, instead of having the interrupts broadcast to all CPUs in the multiprocessor device. In the example of the present invention where a packet manager circuit is processing packet transfers to and from memory on a plurality of input and output channels or queues, interrupt mapping may be achieved by programmably assigning to each channel or queue an interrupt processor identifier. By programmably assigning a processor to each queue for handling interrupts, interrupts from any queue can be statically mapped to any processor. This processor will be interrupted if interrupts are enabled and if that queue generates an interrupt. In addition, each queue also has a high and low priority level associated with it. Additional mapping may be performed by the system controller. The interrupt mapping mechanism helps in dividing the work of different queues to different processors. In addition, with this mechanism, only the processor responsible with a particular queue will be interrupted.

The present invention is advantageously applied as the number of queues increases and as the number of interrupt sources increases. For example, where multiple virtual channels are being processed by the packet manager, the interrupt requests from each channel must be directed and processed efficiently by one of the processors in the multiprocessor device. In addition, multiple interrupt sources for a given channel or queue must also be directed to the appropriate processor for handling. For example, Table 1 shows an example of different interrupt sources (e.g., packet receive/transmit, error, descriptor watermarks, etc.) that may be generated by each input/output queue in the packet manager.

TABLE 1

Interrupt Sources

| Interrupt Type | Interrupt Name | Definition |
| --- | --- | --- |
| Completion | Packet Count | A set number of packets are received |
|  | Packet Received | A full packet is received |
|  | Timer | Receive timer has expired since the last time a packet is received |
| Explicit Descriptor Interrupt |  |  |
| Watermark | Descriptor | This descriptor is done |
|  | High Watermark | Number of descriptors are below the high watermark |
|  | Low Watermark | Number of descriptors are below the low watermark |
| Error | Receive Error | There was an error in the receiving of this packet |
|  | PM error | Packet Manager operation error. |

Rather than hardwiring interrupt lines for each channel and/or interrupt source to a specific processor, the present invention provides a flexible and efficient mechanism for mapping multiple interrupt signals to multiple processors. In a selected embodiment depicted in FIG. 5, the interrupts for a given queue (e.g., channel 31) are stored in a multi-bit interrupt status register 501 (where each bit represents a separate interrupt source). For purposes of expediting processor read operations, the interrupt status registers (indicating up to eight interrupt sources) of eight queues (e.g., channels 0-7) may be merged into a single 64-bit register, and likewise the thirty-two input queues (in this example) can be mapped to four separate 64-bit interrupt status registers (again assuming that each queue has up to eight interrupt sources).

The interrupt mask registers (e.g., 503, 504) are used to block interrupts, which are stored in the interrupt status registers (e.g., 501, 502). For example, masking of the interrupt sources for channel 31 can be implemented with eight AND gates (only two of which are shown for the depicted channel in FIG. 5, e.g., 505, 510) to logically combine the interrupt source register 501 with the mask register 503. Alternatively, individual interrupt sources may be enabled or disabled. All unmasked interrupts for a given channel are passed to the channel's register in the merged interrupt status register 515 after being logically merged (for example, with OR gate 512). Thus, the interrupt sources for each queue can be separately masked by setting the corresponding bit in the interrupt mask register 503. Again, the mask registers for eight queues may also be grouped into a single 64-bit mask register. The masking result can be merged into a merged interrupt value 514 for that queue. In one embodiment, the masked interrupts for each channel (e.g., the outputs of AND gates 505, 510, etc.) are combined by OR gate 512 into a single bit indication for that channel of whether an interrupt has issued (without regard to the type of interrupt).

The single bit indications for each channel are grouped and combined into a multi-bit merged interrupt status register 517 that contains the interrupt state of the input queues after the masking. An identical mask, merge and combine function can be implemented for each output queue being handled by the packet manager. In these merged interrupt status registers 517, each bit (e.g., 514) is set if a queue (e.g., channel 31) has an interrupt pending. For example, thirty-two input queues have their respective interrupt indications merged into a 32-bit merged input interrupt status register 517 constructed of thirty-two flip-flop storage devices. If thirty-two output queues are similarly mapped and grouped into a 32-bit merged output interrupt status register, the input and output registers can be merged into a single 64-bit merged interrupt status register, or they can be stored in two 32-bit registers, one for the PMI 322 and one for the PMO 324.

By combining the merged interrupt values for all queues (channels 0-31) into a merged multi-bit interrupt status register 517, the interrupt value for each queue in the merged interrupt status register 517 is mapped to a predetermined CPU and/or priority using the map register 516. While a variety of mapping techniques are possible, one approach is to demultiplex each interrupt value in the register 517 using a map register 516 to map each channel's merged interrupt value (e.g., 514) to the predetermined processor identified in the map register 516. In an embodiment of the present invention where four CPUs are available for processing interrupts, the map register 516 may include two bits 516a, 516b for separately identifying which of the four CPUs will handle the interrupt. This is the CPU that will service the interrupt requests of this channel. In a selected embodiment, each channel can be mapped to only one CPU, but each CPU line can have any number of channels.

In addition, map register 516 may also include a programmable priority bit 516c for specifying a "high" or "low" priority for the interrupt request, though additional priorities may be specified in the map register 516 using additional priority bits. If the priority of a channel is to be "high," then whenever an interrupt is generated from that channel, the priority bit will be set to "high." If the priority of a channel is to be "low," then the priority bit will be set to "low." Alternatively, separate "low" and "high" bits in the map register can be used to convey priority information for each channel. The priority bits are used by interrupt mapper and/or system controller 346 to assign some channels to higher level interrupt signals and some channels to lower level interrupt signals.

In a selected embodiment, the interrupt mapping functionality of the present invention maps multiple interrupt sources to respective assigned processors for handling the interrupt requests using status registers to provide a two-step identification of the interrupt source by first identifying the channel from which the interrupt issued, and then second identifying the specific interrupt source. For example, FIG. 5 depicts the mapping of thirty-two input channels from the packet manager circuit. All interrupt sources for each channel (e.g., interrupt status register 501 for channel 31) are first masked if necessary (using AND gates 505, 510, 506, 511, etc.). The masked interrupt sources from each channel are merged together (with OR gates 512, 513, etc.) and the results are stored in a register (e.g., flip-flop 514 or other memory device). By combining the registers for each channel into a merged interrupt status register 517, each channel can be mapped to its assigned CPU and priority level by using the map register 516. In particular, for each channel, mapping circuitry (e.g., mapping circuit 541 for channel 31) uses the CPU identification bits 516a, 516b and the priority bit 516c to demultiplex each bit of the merged interrupt status register 517 into eight signals 521-528 (with this example of a 3-bit map register). These eight signals 521-528 are input to the corresponding input of a 32 input OR gate 531-538. As illustrated in FIG. 5, the results of each OR gate 531-538 is the corresponding mapped interrupt signals comprising high and low priority signals for each of the four CPUs. In similar fashion, mapping circuitry for each channel (e.g., 542, 543, 544, etc.) maps the merged status value for channel (e.g., channel 30, 29 . . . 0) from the merged interrupt status register 517 into its assigned CPU and priority level signals (e.g., eight prioritized signals for four CPUs for each channel) by using the map register (e.g., 516, 517, etc.) and demultiplexing circuit (e.g., 520, 523, etc.) for that channel.

The combination of registers from all channels creates the merged interrupt status register 517 which can be read by a CPU or processor core (e.g., SB-1 342) to determine which channels are generating interrupts. The CPU can then read the interrupt status registers for the identified channel to determine the real source of a channel's interrupt. To improve the interrupt handling service time, the interrupt status registers (e.g., 501, 502, etc.), each of which holds multiple (e.g., 8) interrupt source bits, are grouped into four 64-bit registers. By this mechanism, a CPU can determine the source of an interrupt with two Control and Status Registers (CSR) reads.

Figure 6:
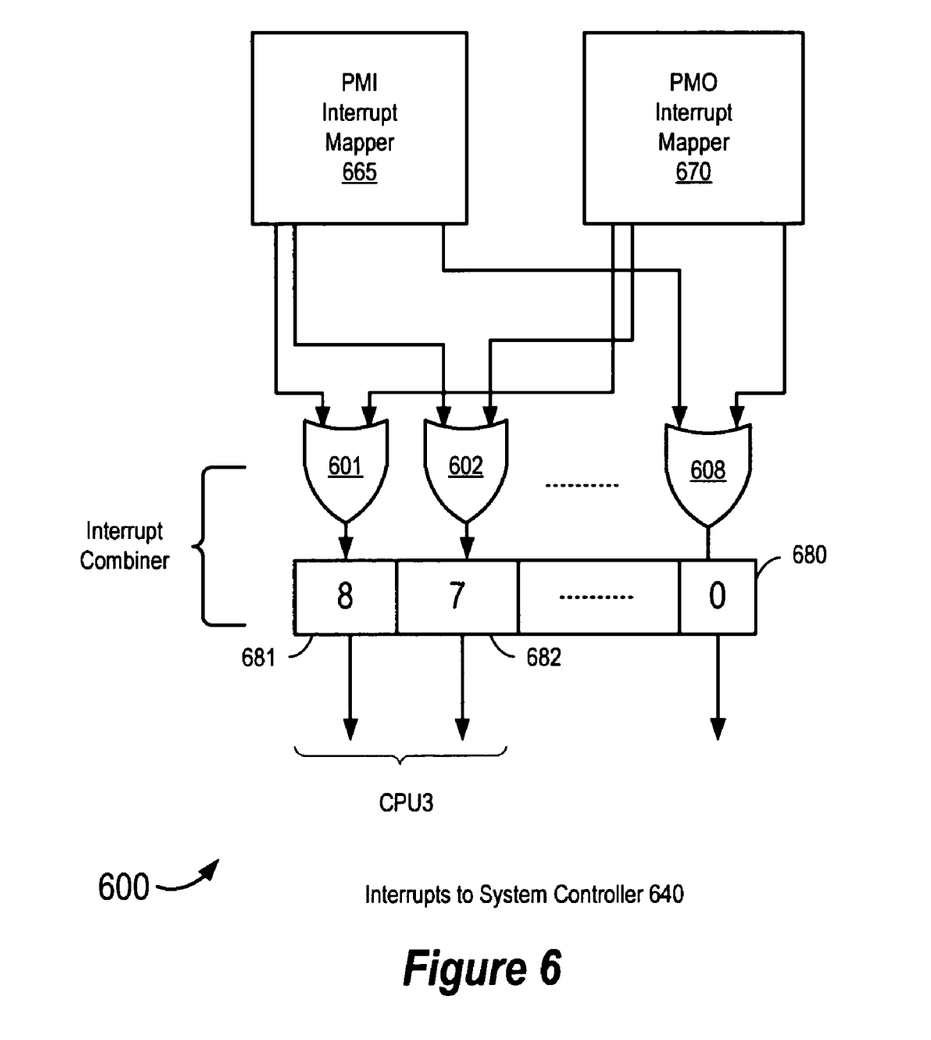
FIG. 6 is a top level diagram of an exemplary embodiment of an interrupt mapper replicated for both input and output channels.

When implemented in a packet manager having dedicated input and output packet managers PMI and PMO that both have interrupt sources, the PMI and PMO may each include an interrupt mapper in accordance with the present invention, as illustrated in FIG. 6. The interrupt signals from PMI interrupt mapper 665 and PMO interrupt mapper 670 (e.g., eight mapped prioritized PMI interrupt signals and eight mapped prioritized PMO interrupt signals) may be merged (via OR gates 601-608) and stored in a combination status register 680, which may be multiple (e.g., 8) read/write registers or flip-flops for storing the interrupt signals from the PMI and PMO before being send to system controller 346. In this example, flip-flop 681 stores the merged high priority mapped interrupts (from the PMI interrupt mapper and PMO interrupt mapper) for CPU3, and flip-flop 682 stores the merged low priority mapped interrupts for this CPU.

Figure 7:
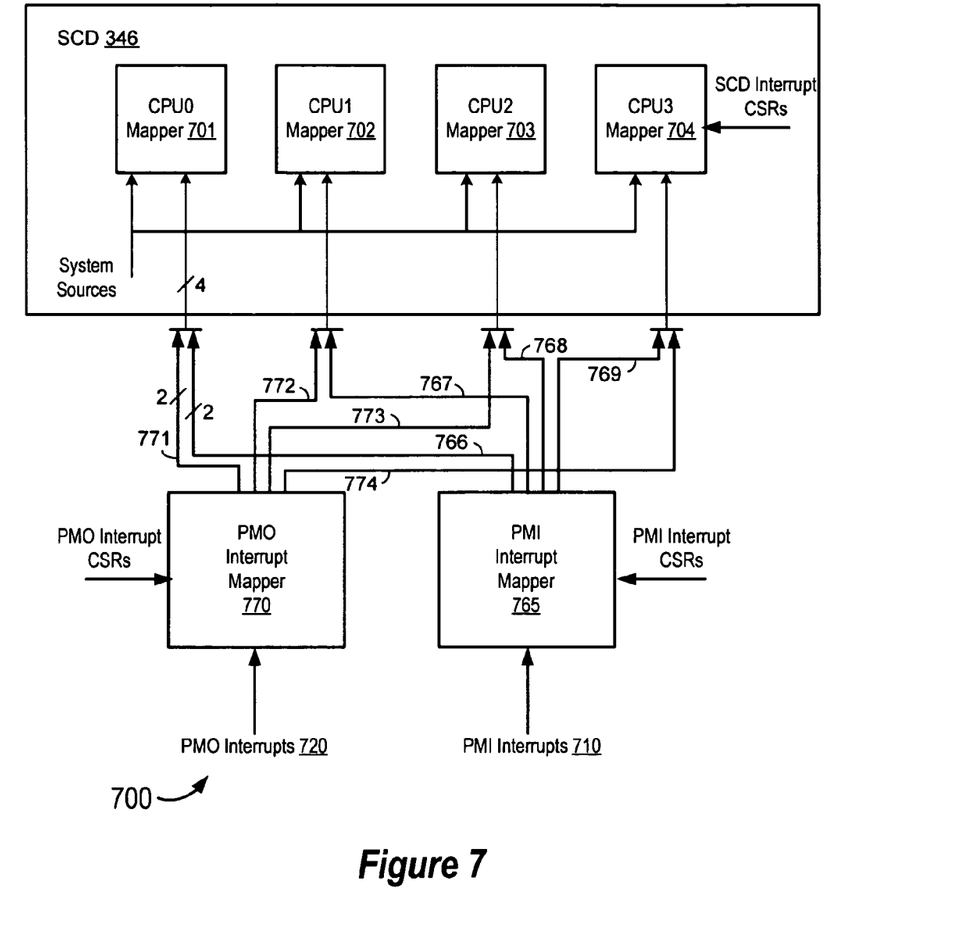
FIG. 7 is a top level diagram of another exemplary embodiment of an interrupt mapper replicated for both input and output channels.

In an alternative embodiment, the interrupt mapping functionality may be distributed across or shared by multiple system modules. For example and with reference to FIG. 7, the interrupt mapper is included as part of the packet manager to provide level sensitive interrupts to the system controller, which has its own interrupt mapper for mapping interrupts to specific CPU interrupt lines. In the embodiment depicted in FIG. 7, the interrupt sources 710 from the packet manager input are masked, merged and combined into a merge interrupt status register, and then mapped or demultiplexed per channel into the mapped interrupted signals 766-769 using the map register in the PMI interrupt mapper 765. In the PMO interrupt mapper 770, PMO interrupts 720 are processed similarly to generate mapped interrupt signals 771-774 for the processors or CPUs. As will be understood, each mapped interrupt signal (e.g., 771) may comprise separate prioritized (e.g., "high" and "low") interrupt signals for each CPU, such as depicted in FIG. 5. The mapped interrupt signals 766-769 and 771-774 may be mapped further to individual interrupt lines for each processor using the additional interrupt mapping modules, such as the CPU mappers 701-710 contained in the system controller 346. As depicted, a CPU mapper (e.g., CPU0 mapper 701) receives the mapped interrupt signals from the packet manager, along with interrupts from other system resources. Each source has an associated mask bit and a multi-bit map register. If the source is interrupting and not masked out, it is driven to one of the CPU interrupt lines according to the mapping. Each source maps to one CPU interrupt line, but there is no limit on how many sources may map to a single CPU line. In addition, a software-based interrupt dispatch may be used to dynamically assign priorities to the interrupts. In one application, the system would merge most of the system sources on a few of the CPUs, and have a single source that needs rapid dispatch on a dedicated CPU. Alternatively, the CPU allocation is dynamically determined by the system software to implement a load balancing function between the CPUs.

In accordance with a selected embodiment, the interrupt status registers and merged interrupt status registers may be grouped into sixty-four bit register groups, whereby the selected processor can determine the source of an interrupt with two read operations. In these embodiments, the processor first reads the merged interrupt status register to determine which channel or queue has generated an interrupt, and then reads the interrupt status register corresponding to the identified channel or queue to determine the cause of the interrupt. This is similar for output queues.

In operation, a processor (e.g., SB-1 345) receives an interrupt in the course of reading resources (such as interrupt mapper 380 in system controller 346) on the system 300 and proceeds to determine the source of the interrupt. For example, the interrupt mapper 380 may include a source register indicating which channels are generating interrupts. The processor may further read an interrupt status register to determine the reason for the interrupt. The interrupt status register could be located in the system controller 346, the packet manager 320 or any other system component that generates interrupts, as desired.

The operation of a processor (e.g., CPU 342) in response to being interrupted is now described with reference to the system 300 depicted in FIG. 3. Other embodiments are possible and contemplated. It is noted that the operational steps described herein may be implemented in software executing on the processor 342 (e.g., an interrupt service routine), hardware, or a combination thereof. The order of operation described is for ease of understanding, and other orders may be used.

The processor reads one or more resources in the system 300 to determine the source of the interrupt. For example, the system controller 346 may include a first control and status register indicating the source of an interrupt. If the source is not a packet manager circuit 320, the processor may continue with interrupt processing in any desired fashion. If the source is the packet manager circuit 320, the processor may further read a merged interrupt status register (or source register) to determine what channel in the packet manager is generating an interrupt, and then may read an interrupt status register (or reason register) for the channel that generated the interrupt to determine the reason for the interrupt. Of course, the reading of the source register may not be necessary when the number of channels and sources being mapped will fit within the reason register, such as where, for example, only eight channels having only eight interrupt sources each are to be mapped, in which case a single 64-bit register will hold the required interrupt mapping information. The source and reason registers may be located in the interrupt mapper 380, the PMI interrupt mapper 370 or the PMO interrupt mapper 375, or may be distributed amongst these elements as desired.

If the reason for the interrupt is other than that one or more packets are ready for processing, the processor may process the other reasons in any appropriate fashion. For example, one such reason may be that the packet manager input circuit 322 has used all the available descriptors (or has less than a threshold number of descriptors remaining for use). The processor may allocate data buffers, point descriptors within the set of descriptors allocated to the packet manager input circuit 322 to the data buffers, and update the PMI configuration registers to reflect the allocated data buffers and updated descriptors. In one embodiment, the current descriptor count is updated by writing the number of newly added descriptors to the configuration register. The packet manager input 322 may add the number to the current descriptor count in response to the write. A variety of other reasons for interrupt by the packet interface circuits may be supported, as desired.

If the reason for the interrupt is that one or more packets are ready, the processor reads the descriptor for the packet (or for the beginning of the packet, if data buffers from more than one descriptor are used to store the packet) to obtain the address of the beginning of the packet, and then processes the packet located by the descriptor.

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry.

Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the multiprocessor system and/or the interrupt mapping circuitry (e.g., processors, memory controller, bus, packet manager circuit (or portions thereof), switch, receive/transmit interface circuits (or portions thereof), etc.).

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. In an integrated circuit multiprocessor switching device, an apparatus for mapping a plurality of interrupts and a plurality of virtual channels through a packet manager to route data packets between external devices and a plurality of processors, comprising:
   an interrupt status register for storing the interrupts;
   mask registers associated with the virtual channels for selectively masking contents of the interrupt status register for each of the virtual channels, the virtual channels for routing the data packets;
   a merged interrupt indication register associated with each virtual channel for storing masked interrupt values for the virtual channels that are obtained after masking and merging the contents of the interrupt status register with the mask registers;
   an interrupt mapping register associated with each virtual channel for storing a processor identification for routing masked interrupt value of a respective virtual channel to a selected processor of the plurality of processors;
   a demultiplexing circuit coupled to the merged interrupt indication register and the interrupt mapping register for coupling the masked interrupt value for each virtual channel to a corresponding one of the selected processors to selectively route the masked interrupt values in the packet manager.

2. The apparatus recited in claim 1 formed in an input circuit of the packet manager for mapping a plurality of interrupts associated with input of a data packet.

3. The apparatus recited in claim 1 formed in an output circuit of the packet manager for mapping a plurality of interrupts associated with output of a data packet.

4. The apparatus recited in claim 1 formed in a system controller for processing interrupts associated with data packets.

5. The apparatus recited in claim 1 wherein the mask registers are programmable to select which interrupts are masked.

6. The apparatus recited in claim 1, wherein the selected processor identified by the processor identification determines an interrupting channel by running an interrupt service routine that first reads the merged interrupt indication register to identify a virtual channel associated with an interrupt and then reads the interrupt status register to determine a respective interrupt.

7. The apparatus recited in claim 1, wherein the interrupt mapping register further includes a priority level indication associated with each virtual channel for prioritizing any interrupt issued.

8. An interrupt mapper in a packet manager for mapping interrupts for a plurality of virtual channels to a plurality of processing cores to route data packets between the processing cores and external devices, comprising:
   a plurality of interrupt registers, where each interrupt register identifies an interrupt for one or more of the plurality of virtual channels, the virtual channels for routing the data packets;
   a mask register associated with each of the plurality of interrupt registers for selectively masking contents of the interrupt register to generate a masked interrupt for each virtual channel;
   a channel merge circuit for merging the masked interrupt for each virtual channel into an interrupt indication value for each respective virtual channel;
   a channel register that stores the interrupt indication values for the plurality of the virtual channels;
   a plurality of processor map storage devices, each processor map storage device storing a processor identification value for respective one of the plurality of virtual channels; and
   a demultiplexer coupled to the channel register and the plurality of processor map storage devices for mapping each interrupt indication value for a virtual channel to a corresponding one of the selected processing cores identified by the processor identification for that respective virtual channel to selectively route the interrupt indication values in the packet manager.

9. The interrupt mapper as recited in claim 8, wherein the channel merge circuit includes a plurality of AND gates coupled to the interrupt registers and the mask register for generating the masked interrupt for each virtual channel.

10. The interrupt mapper as recited in claim 8, wherein each processor map storage device stores a processor identification value and a priority level for respective one of the plurality of virtual channels.

11. The interrupt mapper as recited in claim 8, wherein the channel merge circuit comprises OR gate circuitry for merging the masked interrupts into an interrupt indication value for each virtual channel.

12. The interrupt mapper as recited in claim 8, wherein a processing core that receives an interrupt reads the channel register to determine which virtual channel is associated with an interrupt and then reads the plurality of interrupt registers to determine a respective interrupt source.

13. The interrupt mapper as recited in claim 12, wherein the plurality of interrupt registers and the channel register are each sized to match a processing width of the processing core.

14. The interrupt mapper as recited in claim 13, wherein the selected processing core determines the source of an interrupt with two register reads.

15. The interrupt mapper as recited in claim 8, wherein an interrupt associated with each virtual channel is mapped to only one processing core.

16. The interrupt mapper as recited in claim 8, wherein the plurality of processor map storage devices are programmable to dynamically assign a processing core to a given virtual channel to implement load balancing among the processing cores.

* * * * *